United States Patent
Driusso et al.

(10) Patent No.: US 10,187,815 B2
(45) Date of Patent: Jan. 22, 2019

(54) CALCULATING A RANGING MEASUREMENT IN A CELLULAR COMMUNICATIONS NETWORK

(71) Applicant: U-Blox A.G., Thalwil (CH)

(72) Inventors: Marco Driusso, Merbourn Royston (GB); Christopher Brian Marshall, Reigate (GB)

(73) Assignee: u-blox AG, Thalwil (CH)

( * ) Notice: Subject to any disclaimer, the term of this patent is extended or adjusted under 35 U.S.C. 154(b) by 98 days.

(21) Appl. No.: 15/349,133

(22) Filed: Nov. 11, 2016

(65) Prior Publication Data
US 2017/0150383 A1   May 25, 2017

(30) Foreign Application Priority Data
Nov. 19, 2015   (EP) .................................... 15195460

(51) Int. Cl.
*H04L 12/26* (2006.01)
*H04W 24/08* (2009.01)
(Continued)

(52) U.S. Cl.
CPC ........... *H04W 24/08* (2013.01); *G01S 5/0215* (2013.01); *G01S 5/0273* (2013.01); *G01S 11/08* (2013.01); *G01S 5/14* (2013.01)

(58) Field of Classification Search
CPC ............................... G01S 11/08; H04W 24/08
See application file for complete search history.

(56) References Cited

U.S. PATENT DOCUMENTS 5,550,546 A    8/1996 Noneman et al.
5,859,612 A *  1/1999 Gilhousen ............ H04B 7/2628
                                                  342/428
(Continued)

FOREIGN PATENT DOCUMENTS

WO   WO-2010/096399 A2   8/2010
WO   WO-2014/047352 A2   3/2014

OTHER PUBLICATIONS

J. Del Peral-Rosado, et al., "Joint channel and time delay estimation for LTE positioning reference signals," in Satellite Navigation Technologies and European Workshop on GNSS Signals and Signal Processing, (NAVITEC), 2012. 8 Pages.
M. Driusso, C. Marshall, M. Sabathy, F. Knutti, H. Mathis, F. Babich, "Vehicular position tracking using LTE signals", IEEE Transactions on Vehicular Technology, Jul. 13, 2016. pp. 1-16.
(Continued)

*Primary Examiner* — Minh Trang T Nguyen
(74) *Attorney, Agent, or Firm* — Finnegan, Henderson, Farabow, Garrett & Dunner LLP

(57) ABSTRACT

A method and apparatus for calculating a ranging measurement in a cellular communications network. The method comprises: receiving (710) at a receiver (910) a first signal associated with a first cell-sector of a sectorised base station in the cellular communications network; determining (712; 812) at least one first time of arrival at the receiver (910) of a portion of the first signal; receiving (711) at the receiver (910) a second signal associated with a second cell-sector of the sectorised base-station; determining (713; 813) at least one second time of arrival at the receiver (910) of a portion of the second signal; and calculating (720; 820) a ranging measurement between the base station and the receiver (910), based on a combination of the at least one first time of arrival and the at least one second time of arrival.

16 Claims, 6 Drawing Sheets

(51) Int. Cl.
  *G01S 5/02* (2010.01)
  *G01S 11/08* (2006.01)
  *G01S 5/14* (2006.01)

(56) References Cited

U.S. PATENT DOCUMENTS

2015/0281899 A1* 10/2015 Sendonaris ........... G01S 5/0273
  455/456.1
2015/0303958 A1* 10/2015 Davydov ............. H04W 72/12
  375/341

OTHER PUBLICATIONS

M. Driusso, et al., "Estimation and Tracking of LTE Signals Time of Arrival in a Mobile Multipath Environment", in Proceedings of the 9th International Symposium on Image and Signal Processing and Analysis (ISPA 2015), Zagreb, Croatia, Sep. 7-9, 2015. 6 Pages.

H. Durrant-Whyte and T. Bailey, "Simultaneous Localization and Mapping (SLAM): Part I The Essential Algorithms", IEEE, 2006. pp. 1-9.

F. Knutti, M. Sabathy, M. Driusso, H. Mathis and C. Marshall, "Positioning Using LTE Signals," 2015. 8 Pages.

J. Li, J. Conan and S. Pierre, "Mobile Station Location Estimation for MIMO Communication Systems," in Wireless Communication Systems, 2006. ISWCS '06. 3rd International Symposium on, 2006. 4 Pages.

P. Meissner, "Multipath-Assisted Indoor Positioning," Graz University of Technology, Oct. 2014, 175 Pages.

J. Riba and A. Urruela, "A robust multipath mitigation technique for time-of-arrival estimation," in Vehicular Technology Conference, 2002. Proceedings. VTC 2002—Fall. 2002 IEEE 56th, 2002. pp. 2263-2267.

J. Winter and C. Wengerter, "High resolution estimation of the time of arrival for GSM location," in Vehicular Technology Conference Proceedings, 2000. VTC 2000—Spring Tokyo., 2000. pp. 1343-1347.

\* cited by examiner

CALCULATING A RANGING MEASUREMENT IN A CELLULAR COMMUNICATIONS NETWORK

FIELD OF THE INVENTION

This invention relates to a method and apparatus for calculating a ranging measurement in a cellular communications network—for example, a ranging measurement between user equipment (UE) and a base station (BS). This may be useful to assist in determining the position of the UE. It is believed that aspects of the invention may be particularly beneficial when applied in the context of a 4G Long-Term Evolution (LTE) network.

BACKGROUND OF THE INVENTION

It is known to determine the position of a mobile communications device (often referred to in the art as "user equipment") by observing signals that are available in the local environment and are detectable by a receiver in the device. These signals are not necessarily intended for providing a positioning function and are sometimes termed "Signals of Opportunity" ("SoOps").

In particular, it is known to use the signals transmitted by cellular base stations in a cellular communications network as SoOps, for calculating position. Base station signals are advantageous from this point of view, because the signal from each individual base station is transmitted over a relatively small area. Additionally, base station signals tend to have relatively stable timing, because communications in all cellular networks rely, to a greater or lesser extent, on having a consistent timing reference and frequency reference.

One approach is for the device to measure the time of arrival of a defined portion of the signal from a given base station. This procedure is then repeated for other signals, from other base stations that are "visible" from the device's position. Each time of arrival can be used to calculate a ranging measurement between the device and the respective base station. With enough of these ranging measurements, and some additional knowledge (for example, about the locations of the base stations), it is possible to calculate the position of the device, by trilateration. The process is analogous to that used by satellite positioning receivers to calculate their positions using satellite positioning signals, but with the difference that the cellular signals are not primarily intended for positioning applications.

Using the time of arrival (TOA) of the base station signal to calculate a ranging measurement relies on the assumption that the signal arrived at the mobile communications device from the base station via a direct, line-of-sight propagation path. And since the accuracy of the position calculation depends on measuring the time of arrival accurately, anything that interferes with the time of arrival measurement will degrade the accuracy of the resulting position estimate. Multipath conditions pose a particular problem, because they can lead to ambiguity in the measured time of arrival. But multipath conditions are widely prevalent—especially in dense urban environments, where each building may be capable of reflecting the base station signal and creating an additional multipath component.

There is therefore a need for approaches that are more robust to multipath effects.

SUMMARY OF THE INVENTION

The invention is defined by the claims.

According to an aspect of the present invention, there is provided a method of calculating a ranging measurement in a cellular communications network comprising:

receiving at a receiver a first signal associated with a first cell-sector of a sectorised base station in the cellular communications network;

determining at least one first time of arrival at the receiver of a portion of the first signal;

receiving at the receiver a second signal associated with a second cell-sector of the sectorised base-station;

determining at least one second time of arrival at the receiver of a portion of the second signal; and calculating a ranging measurement between the base station and the receiver, based on a combination of the at least one first time of arrival and the at least one second time of arrival.

A sectorised base station is one that controls several cell-sectors. The area around the base station is logically divided into azimuthal cell-sectors. The gain patterns of antennas deployed on a sectorised base station are preferably designed to radiate the power of a wireless signal over these quasi non-overlapping areas so as to achieve minimum interference between sectors. The use of cell-sectors allows a geographical area to be subdivided into smaller cells (for a given number of base stations) than if each base station controlled just one cell, with the base station located at the centre of that cell.

It is usually intended that signals from different cell-sectors of the same base station can only be received concurrently by a receiver in a small region of overlap between the cell-sectors—a narrow region straddling the notional boundary between the cell-sectors. This is intended by the network operator, because it facilitates handovers for mobile devices as they move between cell-sectors. The directional nature of the cell-sector signals that are broadcast by the base station is designed to ensure this. However, the present inventors have observed that multiple cell-sector signals from the same base station are receivable more widely than in this small intended region of overlap. Reception of signals from other cell-sectors can occur anywhere in a cell-sector because of complex multipath propagation conditions—for example, due to the effects of reflection or diffraction by obstacles, or due to one or more side lobes or a back lobe in the radiation pattern of the signal for another cell-sector.

The inventors have also recognised that signals transmitted for different cell-sectors (controlled by the same base station) are typically very well synchronised in time. This is because the timing is, in many cases, determined by a single clock at the base station, which ultimately controls the timing of the signals for all sectors. This means that, even if there is drift in the timing, all sectors controlled by the same base station drift together, such that their relative timing remains stable. The inventors have therefore recognised that the signals for the different cell-sectors are transmitted from essentially the same location and with a stable relative timing. The inventors have further recognised that these characteristics can be exploited to improve the accuracy of methods that rely on measuring the time of arrival in order to establish ranging measurements and optionally calculate position by trilateration. In particular, calculation of ranging measurements can be improved by considering the different cell-sector signals of the same base station together, rather than treating them independently, like two arbitrary cells controlled by arbitrary base stations.

According to an embodiment of the present method, the ranging measurement is calculated based on a combination of the at least one first time of arrival and the at least one second time of arrival. This means that the ranging measurement can change either if the at least one first time of arrival changes or if the at least one second time of arrival changes. The ranging measurement is therefore dependent on both the at least one first time of arrival and the at least one second time of arrival.

The portion of each signal, whose time of arrival is determined, may be a periodically repeating portion of the signal. For example it may be a synchronisation portion or symbol. In particular, if the cellular communications network is a 4G Long-Term Evolution (LTE) network, the portion may be a Positioning Reference Signal (PRS) or a Cell-specific Reference Signal (CRS).

Each step of determining at least one time of arrival may comprise estimating a channel transfer function. The channel transfer function may be estimated in the frequency domain. The channel transfer function may be transformed to the time domain, to produce a channel impulse response. The at least one time of arrival may be determined from a peak (local maximum) in the channel impulse response.

The method—in particular, the step of calculating the ranging measurement—may comprise identifying, based on a relationship between the at least one first time of arrival and the at least one second time of arrival, multipath propagation conditions existing between the base station and the receiver.

Multipath propagation conditions may be characterised by diverse times of arrival, corresponding to signal components that have arrived at the receiver from the base station by different paths. These components may be components of the first signal, components of the second signal, or a combination of both.

The method optionally further comprises, before the step of calculating the ranging measurement, identifying that the first signal and the second signal were transmitted by the same base station.

The step of identifying that the first signal and the second signal were transmitted by the same base station may comprise decoding cell-identity information contained in each signal.

In some cellular networks, the cell-identity information that is encoded in the signal transmitted for a given cell-sector may contain an explicit or implicit indication of the base station that controls that cell (and transmits the signal). Therefore, by comparing the cell-identity information decoded from the first signal with the cell-identity information decoded from the second signal, it is possible to identify whether they were transmitted by the same base station or not.

Optionally, the step of identifying that the first signal and the second signal were transmitted by the same base station comprises using the decoded cell-identity information as a key to search a database of cell-sectors, wherein each cell-sector is associated in the database with the base station that controls it. This may be appropriate if the identity of the base station is not explicit or implicit in the cell-identity information within the signal itself, as it provides an alternative way to identify whether the signals were transmitted from the same base station.

The method optionally comprises: determining an expected timing relationship between the time of transmission by the base station of the portion of the first signal and the time of transmission by the base station of the portion of the second signal; and in the step of calculating the ranging measurement, calculating the ranging measurement based on a combination of the at least one first time of arrival and the at least one second time of arrival, using the expected timing relationship.

Because of the relatively stable timing at the base station and the synchronisation of each cell-sector to this stable timing, it may be possible to determine reliably an expected timing relationship between portions of the first signal and the second signal. This can be exploited in the step of calculating the ranging measurement.

The step of determining the expected timing relationship may comprise decoding cell-identity information contained in each signal.

The timing relationship may be implicit from the cell-identity—for example, if all cell-sectors controlled by the same base station share identical timing, such that the portion of the first signal and the portion of the second signal are transmitted concurrently and synchronized with one another. In such cases, the portion of the first signal and the portion of the second signal may be transmitted at substantially the same time (in particular, without any intentional offset between them).

The step of determining the expected timing relationship optionally comprises using the decoded cell-identity information as a key to search a database of cell-sectors, wherein each cell-sector is associated in the database with the base station that controls it, and the database further comprises timing information that describes the timing relationships between cell-sectors of the same base station.

The database can allow the cell-identity to be mapped to information about the timing relationship between that cell-sector and other cell-sectors controlled by the same base station. The database may be stored on board a mobile communications device performing the method (wherein the receiver mentioned above is a part of the mobile communications device). Alternatively, or in addition, the database may be stored elsewhere and accessed remotely by the mobile communications device. For example, the database may be stored on a remote server and the method may comprise accessing the database via a communications network (which may be the cellular communications network already mentioned, or may be another network).

The expected timing relationship may comprise a time offset between the times of transmission by the base station of the portion of the first signal and the portion of the second signal, and the step of calculating the ranging measurement may further comprise correcting for the time offset.

Correcting for the time offset may comprise adding the time offset to the at least one first time of arrival or to the at least one second time of arrival, or subtracting the time offset from the at least one first time of arrival or from the at least one second time of arrival.

The method preferably further comprises calculating a position of the receiver using the ranging measurement.

The position may be calculated by means of trilateration using ranging measurements for at least two, at least three, or at least four base stations, for example.

Optionally, if the at least one first time of arrival comprises a plurality of first times of arrival, the method comprises reducing the plurality of first times of arrival to a single first time of arrival; if the at least one second time of arrival comprises a plurality of second times of arrival, the method comprises reducing the plurality of second times of arrival to a single second time of arrival; and the step of calculating the ranging measurement is based on a combination of the single first time of arrival and the single second time of arrival.

The plurality of first times of arrival may correspond to a respective plurality of signal components. These signal components are different versions of the portion of the first signal, which have arrived at the receiver by different propagation paths. This is the multipath situation discussed earlier above. The same applies to the plurality of second times of arrival.

The step of reducing a plurality of times of arrival to a single time of arrival may comprise selecting an earliest time of arrival among the plurality of times of arrival. This is based on the assumption that the direct propagation path from the base station to the receiver is the shortest path and therefore an earliest time of arrival is likely to be for the direct path. (The other times of arrival are assumed to be "echoes" of the direct path component.)

Alternatively or in addition, the step of reducing a plurality of times of arrival to a single time of arrival may comprise selecting among the plurality of times of arrival based on received signal strengths of the plurality of signal components.

The step of calculating the ranging measurement may comprise selecting an earliest among the at least one first time of arrival and the at least one second time of arrival.

This is one advantageous way of combining the at least one first time of arrival with the at least one second time of arrival. Here, the knowledge that the first signal and the second signal originated from the same base station is used implicitly to choose the most reliable measurement (assumed to be the earliest time of arrival) while ignoring less reliable measurements.

If the at least one first time of arrival consists of a single first time of arrival and the at least one second time of arrival consists of a single second time of arrival, calculating the ranging measurement may comprise selecting the earlier of these two times of arrival.

Optionally, a first confidence value is associated with the at least one first time of arrival; a second confidence value is associated with the at least one second time of arrival; and the step of calculating the ranging measurement comprises combining the at least one first time of arrival and the at least one second time of arrival based on the first confidence value and the second confidence value.

The confidence values may comprise any measured or calculated value that is found to correlate with the accuracy of the determined times of arrival.

In some embodiments, the confidence values may be metrics derived from signal strength measurements—including but not limited to: signal-to-noise ratio; and signal-to-interference+noise ratio. It is expected that if a time of arrival is determined from a signal with relatively high signal strength, the signal component that gave rise to that measurement is likely to be a direct path signal and therefore the time of arrival is accurate.

Alternatively or in addition, the confidence values may comprise a degree of spread observed in the determined at least one time of arrival. For example, when more than one time of arrival has been determined for the portion of the first signal (or respectively, the portion of the second signal) a degree of spread may be calculated by subtracting the earliest time of arrival from the latest time of arrival. It is expected that, if there is a relatively large spread in the times of arrival, this may indicate inaccuracy, because there is inconsistency between the times and relatively large uncertainty about which time of arrival might be the direct path.

Conversely, if there is a relatively small spread in the times of arrival, this may indicate relatively greater accuracy, because the times of arrival are more consistent and less error will be introduced even if the time of arrival for the direct path is not found. Therefore, a confidence value may be calculated which is inversely proportional to the degree of spread in the times of arrival. If there is just one time of arrival, the degree of spread may be zero.

The at least one first time of arrival and the the at least one second time of arrival may be combined in a variety of ways, based on the confidence values. For example, the step of calculating the ranging measurement may comprise calculating an average of the at least one first time of arrival and the at least one second time of arrival. The average may be a weighted average—for example, weighted according to the respective confidence values.

The step of calculating the ranging measurement preferably comprises selecting among the at least one first time of arrival and the at least one second time of arrival by comparing the first confidence value with the second confidence value.

This is one simple but effective way to combine the times of arrival based on the confidence values.

The method may comprise estimating the at least one first time of arrival and the at least one second time of arrival, for portions of the first signal and portions of the second signal respectively, in a plurality of time intervals; the first confidence value may comprise a measure of the consistency of the estimated at least one first time of arrival over the plurality of time intervals; and the second confidence value may comprise a measure of the consistency of the estimated at least one second time of arrival over the plurality of time intervals.

The measure of consistency may be a statistical measure. The statistical measure may comprise a variance of the time of arrival, for example.

Also provided is a computer program comprising computer program code adapted to control a mobile communications device to perform all the steps of a method as summarised above, when said program is run on a processor of said mobile communications device.

The computer program is preferably embodied on a non-transitory computer readable medium.

According to another aspect of the invention, there is provided a mobile communications device comprising:
a receiver, for receiving radio signals from a sectorised base station in a cellular communications network; and
a processor, adapted to determine a ranging measurement between the base station and the mobile communications device,
wherein the receiver is adapted to:
receive a first signal associated with a first cell-sector of the sectorised base station; and
receive a second signal associated with a second cell-sector of the sectorised base-station,
and wherein the processor is adapted to:
determine at least one first time of arrival at the receiver of a portion of the first signal;
determine at least one second time of arrival at the receiver of a portion of the second signal; and
calculate the ranging measurement based on a combination of the at least one first time of arrival and the at least one second time of arrival.

The processor is preferably adapted to process the signals received by the receiver to determine a position of the mobile communications device.

The mobile communications device preferably further comprises a channel estimator for estimating a first channel transfer function for the first signal and a second channel transfer function for the second signal, wherein the processor is adapted to determine the at least one first time of arrival from the first channel transfer function and to determine the at least one second time of arrival from the second channel transfer function.

BRIEF DESCRIPTION OF THE DRAWINGS

The invention will now be described by way of example with reference to the accompanying drawings, in which.

DETAILED DESCRIPTION

Figure 1:
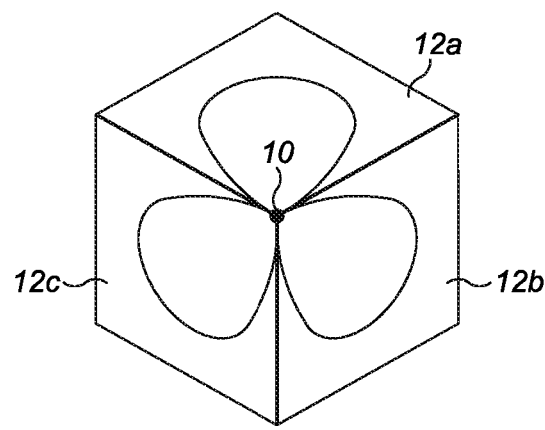
FIG. 1 is a schematic drawing showing an arrangement of three cell-sectors around a base station.

An embodiment of the invention relates to a method for improving the accuracy of ranging measurements of signals used in a cellular positioning system. In general, embodiments are applicable to all modern cellular systems where a single base station can control multiple cell-sectors—that is, all cellular communications networks comprising at least one sectorised base station. FIG. 1 shows an example of an LTE base station 10, also called evolved Node B (eNodeB), where the area surrounding the base station 10 is divided in three cell-sectors 12a, 12b, 12c. In order to physically separate signals among neighbouring cell-sectors, the antennas deployed on the sectorised base station 10 are usually designed to radiate the power of a radio signal over quasi non-overlapping areas so as to achieve only minimal inter-sector interference. In FIG. 1, the hexagonal area surrounding the base station 10 is divided notionally into three rhombus-shaped cell-sectors 12a, 12b, 12c. The radiation pattern of the signal for each cell-sector is indicated schematically by a single lobe in each sector, originating at the base station 10. The cell-sectors 12a, 12b, and 12c are shown as non-overlapping in FIG. 1, but, in practice, there will be some overlap between the radiation patterns. Indeed, some overlap at the boundaries between the cell-sectors is desirable, to allow handover when a mobile communications device moves from one cell-sector to another.

Conventionally, a mobile communications device does not know and does not care whether the base station 10 is sectorised. A mobile communications device or user equipment (UE) located at the boundary between cell-sectors 12a and 12b simply receives two signals, which may be different cell-sectors of a single base station, or may be different cells controlled by respective different base stations.

Because of the directional quasi non-overlapping radiation patterns, the Received Signal Strength (RSS) of a signal of a given cell-sector is usually quite high when the UE is located centrally within the area served by that cell-sector, but it decreases rapidly as the UE moves away from that area. When the UE is located in the specific area served by a cell-sector it would be intended to use only the radio signal associated with that cell-sector for cellular communications.

Recent experiments by the applicant have revealed surprising results about the true geographic coverage of signals radiated by a sectorised base station. Experimental results show that it is relatively common for the signals transmitted to different cell-sectors of the same base station to be detectable outside their assigned cell-sector area and within the area assigned to neighbouring cell-sectors. Experiments also show that cellular signals can be affected by significant degradation even within their assigned cell-sector area of coverage. Under these circumstances, timing measurements for positioning purposes can be challenging and inaccurate.

Embodiments of the invention can address this problem by actively combining measurements of signals coming from different cell-sectors of the same base station, whenever possible. It can be shown that, under certain propagation conditions, by detecting and combining information from the different signals, more accurate ranging measurements can be obtained, for use in cellular positioning algorithms.

As used herein, a ranging measurement means an estimate of a distance from a cellular base station to a user equipment. Typically, the ranging measurement is a pseudorange. A ranging measurement may be an implicit or explicit estimate of distance. For example, a ranging measurement such as a pseudorange may be represented in units of distance or in units of time—for instance, expressing a time-of-flight of a signal. A ranging measurement changes if there is a change in the distance between the UE and the base station. The change in range (distance) is the change in the time of flight of the signal over the (changed) distance, multiplied by the speed of light. The computation of a ranging measurement may comprise, for example, measuring a code-phase or a carrier phase of the received signal. Often, ranging measurements are not absolute or unique measurements—they typically incorporate some degree of relativity or uncertainty. For example, a time-of-flight can be calculated as the difference between a time of transmission of a portion of a signal and the time of arrival at the receiver of that portion of the signal. However, at the receiver, the exact time of transmission may be unknown or uncertain. Therefore, the time of flight cannot be determined accurately, in absolute terms. This translates into uncertainty in the distance estimate, because the distance estimate is usually simply the time of flight multiplied by the speed of light. The term "ranging measurement" should therefore be understood to include both measurements including some degree of uncertainty as well as absolute and/or unique distance measurements. Positioning algorithms such as trilateration, which are known in the art, are able to resolve or ignore this uncertainty, by combining ranging measurements for multiple different base stations.

Modern cellular systems are not immune to signal quality degradation. Even though most of the methods for timing measurements don't usually demand strict requirements in terms of signal quality, they can be quite fragile under certain multipath conditions. In generic terms, the aim of a timing measuring algorithm is to calculate the Time of Arrival (TOA) of a portion of a signal for positioning purposes. When multiple replicas (multipath components) of the same signal are received over a short period of time, it becomes difficult to separate the overlapping copies of the received signal so as to correctly perform the measurement of the time of arrival of each component. Note that, in order to obtain accurate ranging measurements, the TOA has to be measured on the line-of-sight (LOS) component of the signal—that is, the direct path. This is sometimes not easy to isolate from the signal components that have travelled to the receiver of the UE over indirect paths.

This is particularly evident in diversified environments, where challenging propagation areas (for example, big buildings, reflectors, small and big obstacles) and free propagation areas are randomly scattered without any ordered plan or specific pattern. Such conditions are found in most urban environments. And, as mentioned above, even though the antennas of sectorised base stations are designed to minimize inter-sector interference, it is not uncommon for a mobile UE located centrally in one cell-sector to detect signals from adjacent cell-sectors from the same base station with significant RSS.

Timing measurements can be performed on cellular signals by calculating the time of arrival of a predetermined portion of the signal. To identify the predetermined portion of the signal, the format or structure of the cellular signal may be known in advance or this may be deduced by observation. Knowledge of the structure of the cellular signal along with the position of the base stations is often used in ranging cellular positioning systems, as will be familiar to those skilled in the art. The predetermined portion may be the CRS or the PRS in LTE cellular systems.

A local copy of the predetermined portion of the signal is used to estimate the Channel Transfer Function which is then transformed into the time domain. The TOA is then extracted from the resulting Channel Impulse Response (CIR) by firstly estimating the number of different paths by which the signal arrived at the receiver (in other words, estimating the number of multipath components). Each path (respectively, component) is assumed to be represented by a peak in the impulse response. The time index of each peak is assumed to represent a time of arrival of the associated multipath component. The method proceeds by selecting a particular peak of interest among the N peaks above a predetermined RSS threshold (signal strength). For use in positioning, the time of arrival of the earliest received peak is selected, to enable the TOA of the LOS component of the signal to be calculated. The time of arrival of the earliest received peak is then used to calculate the ranging measurement.

Figure 2:
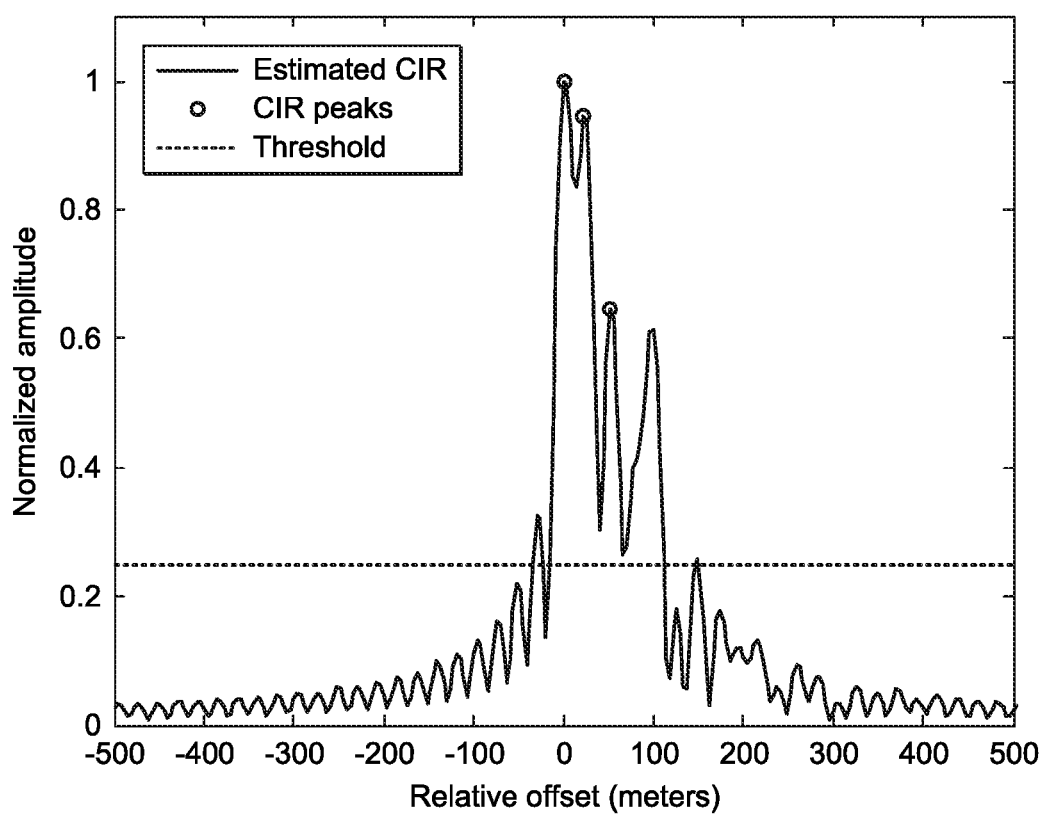
FIG. 2 shows a channel impulse response suitable for measuring one or more times of arrival of a signal.

FIG. 2 shows an example of a CIR, with each of the three highest peaks (N=3) marked with a circle. The scale on the x-axis is marked in units of distance (metres) rather than time, to emphasise the impact on the ranging measurement if the wrong peak is detected. The earliest of the three highest peaks is assigned to a distance offset of zero on this scale. As will be apparent to those skilled in the art, the conversion factor between time and distance is the speed of light, c, since this is the speed at which the radio waves from the base station travel.

Figure 3:
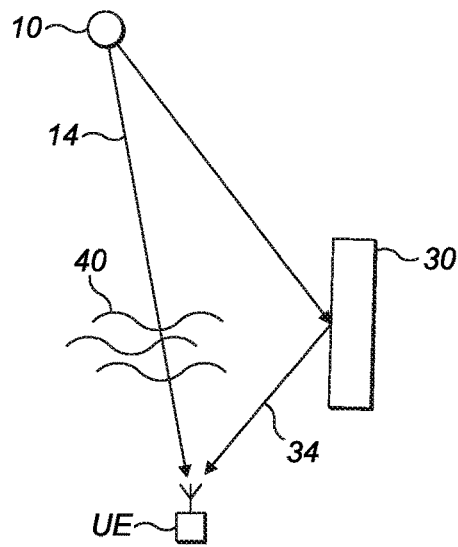
FIG. 3 shows a simple example of how multipath effects can arise in a real propagation environment.

FIG. 3 shows an example where multipath effects can significantly degrade the accuracy of timing measurements. The LOS component of the signal (also called direct path component) 14 transmitted by the base station 10 is characterized by a low Received Signal Strength (RSS) caused by a series of small obstacles 40 between the base station and the mobile communications device UE. For example, the mobile communications device UE may be in the shadow of the obstacles 40. At the same time, the signal is reflected by a big obstacle 30, which could be a building or a hill, for example. This reflection creates a multipath component 34 with a higher RSS than the direct path component 14. The applicant's experimental results have shown that this situation occurs relatively commonly in real propagation environments—especially in urban areas. In such circumstances, the peak in the impulse response corresponding to the multipath component 34 would be likely to influence the timing measurement algorithm, thereby leading to an inaccurate timing measurement.

Figure 4:
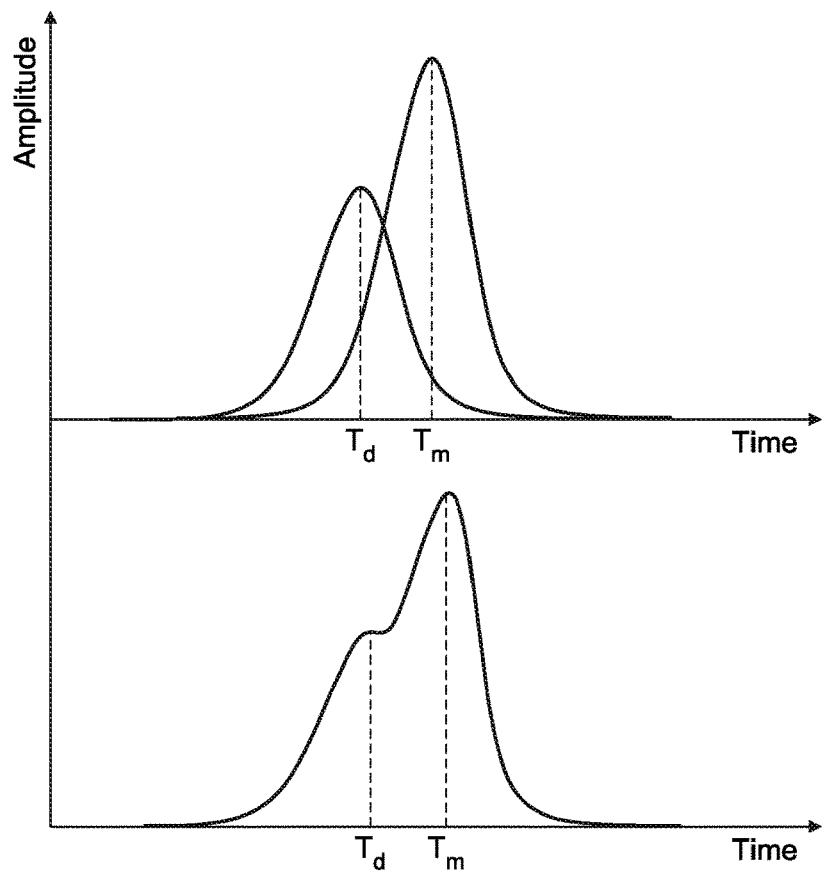
FIG. 4 illustrates how multipath effects can interfere with the measurement of a time of arrival of a signal from a channel impulse response.

FIG. 4 illustrates how a strong multipath component having a time of arrival that is close to the direct path time of arrival can interfere with the timing measurement. $T_d$ is the time of arrival of the direct path signal 14. $T_m$ is the time of arrival of the multipath (reflected) component 34. In the example of FIG. 4, the upper graph shows the channel impulse responses of the two respective components separately. The lower graph shows the superposition of these two responses, which is what is observed at the receiver of the mobile communications device UE. Because of the presence of the strong multipath component, no separate peak can be detected for the direct path component 14.

An additional problem related to the estimation of the Time of Arrival is caused by the fact that the evaluation of the Channel Transfer Function and the estimation of the number of paths (number of multipath components) can be inaccurate. In particular, when the RSS varies quickly, the multipath estimator can create false early peaks. These peaks may be interpreted incorrectly as having been generated by the direct path.

Embodiments of the invention can improve the accuracy of timing measurements on signals coming from a single base station in a cellular communications network, in order to improve the accuracy of position estimation. This can be achieved by combining information from signals associated with multiple cell-sectors. As discussed already above, it has been found in practice that there is a larger than expected area of overlap among cell-sector signals received from a sectorised base station.

Figure 5:
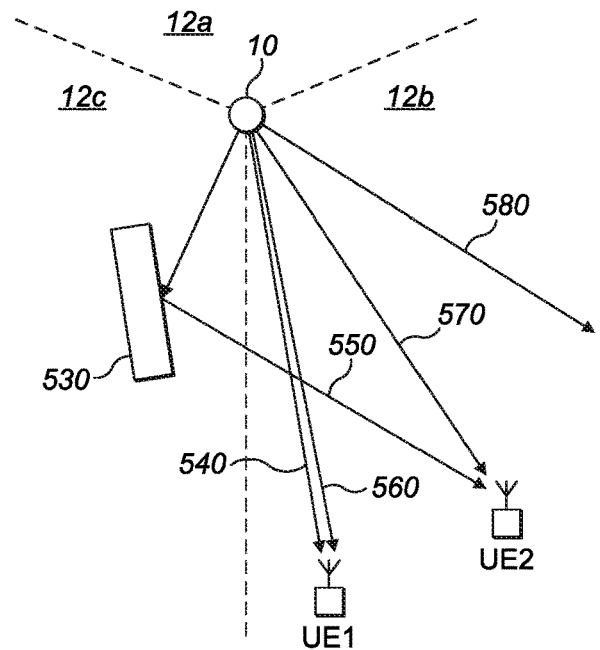
FIG. 5 illustrates ways in which a signal that is primarily intended to be transmitted toward one cell-sector can be received in another cell-sector.

FIG. 5 illustrates two mechanisms by which a signal transmitted by the base station 10 for a first cell-sector 12c can be received by a receiver located in a second cell-sector 12b. The arrows 560, 570, and 580 indicate signal paths travelled by the signal intended for cell-sector 12b. The arrows 540 and 550 indicate signal paths travelled by the signal intended for cell-sector 12c. FIG. 5 shows two mobile communications devices, UE1 and UE2, both located in cell-sector 12b. UE1 is able to detect the direct path component 560 of the signal intended for cell-sector 12b (that is, the cell-sector where it is located), and it can also detect the direct path component 540 of the signal intended for the neighbouring cell-sector 12c. This is typical when a UE is close to the boundary between adjacent cell-sectors, or close to the base station 10. UE2 is able to detect the direct path component 570 of the signal intended for cell-sector 12b (that is, the cell-sector where it is located), and it can also detect an indirect or multipath path component 550 of the signal intended for the neighbouring cell-sector 12c. In this case, the multipath component is due to reflection from an obstacle 530, but in general it could be due to diffraction or reflection or a combination of both. This is typical when the neighbouring cell-sector 12c has significant obstacles such as tall buildings or hills.

According to one embodiment of the invention, signals transmitted by the same base station for different cell-sectors are grouped together and the measurements made on these different signals are compared. The comparison can then be used to improve the accuracy of ranging measurements and, in turn, positioning.

Conventionally, during normal cellular operating conditions the signals for neighbouring cell-sectors are monitored by the UE only to a limited extent. For example, the RSS of the signal for the neighbouring cell-sector may be measured to decide when to handover between cell-sectors. Of course, conventionally, the UE does not need to be aware that both cell-sectors are controlled by the same base station—it treats them the same as any two cells in the cellular communications network.

According to an embodiment of the invention, the cellular radio at the UE is adapted or controlled or programmed to scan and monitor for signals coming from all visible cellular signals even when this is not required by the usual cellular networking protocols. Such adaptation, control, or programming will be within the capabilities of those skilled in the art of cellular positioning. The step of monitoring for the presence of cellular signals and then measuring their timing can be done continuously or periodically, or it can be triggered by a specific request—for example, from a software application or from the operating system of the mobile communications device.

According to embodiments of the invention, a method is provided that can improve the accuracy of TOA measurements of the direct path component of signals coming from a single base station. The more accurate TOA measurements can be used to produce more accurate ranging measurements. Therefore, the method is directly applicable to any positioning engine which uses ranging measurements (for example, pseudoranges) to calculate the position of a mobile communications device or user quipment (UE). Ranging measurements may be based on the Time of Flight (ToF) of a radio signal transmitted from a base station to the mobile communications device. Since ToFs are usually calculated as a function of the measured TOA of the direct path component of a known portion of the signal, the accuracy of the calculated pseudorange depends on the accuracy of the TOA measurements.

Figure 6:
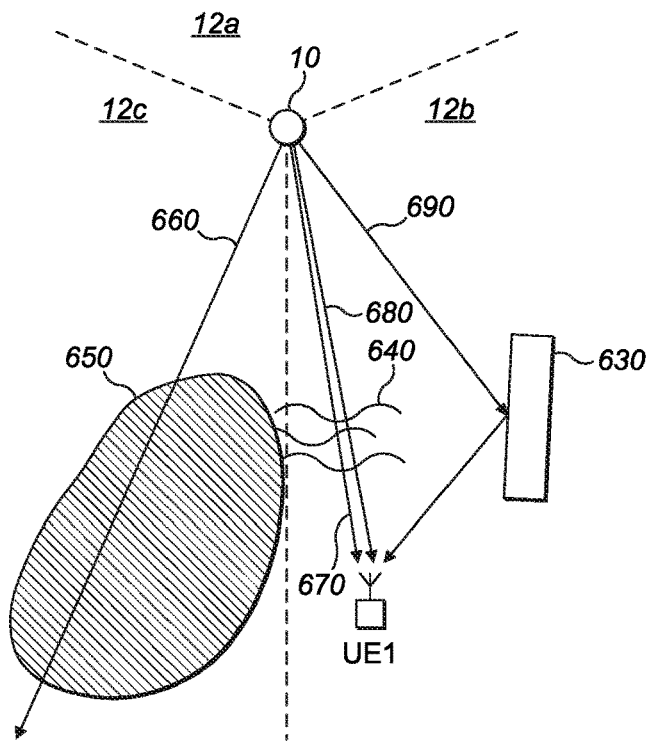
FIG. 6 illustrates an example in which a signal that is intended for one cell-sector is affected by multipath effects to a relatively greater extent, while a signal that is intended for a neighbouring cell-sector is affected by multipath effects to a relatively lesser extent.

The cell-sector in which the UE is operating will be referred to as the "operating cell-sector". In some circumstances, the signal transmitted by the base station for the operating cell-sector is disrupted by multipath, but the signal transmitted by the same base station for a neighbouring cell-sector is not disrupted. FIG. 6 depicts an example in which a signal 660, 670 intended for a neighbouring cell-sector 12c is characterized by better signal properties than a signal 680, 690 serving the cell-sector 12b, thus resulting in more accurate timing measurements from the neighbouring cell-sector signal. The operating cell-sector 12b includes multiple obstacles 630, 640, causing reflection and degradation of the cellular signal for the operating cell-sector, at the location of UE1. This is similar to the situation explained above with reference to FIGS. 3 and 4—the received signal for the operating cell-sector 12b is the result of multiple overlapping replicas which can be closely spaced in time. In this situation, the timing measuring algorithm may fail to identify the correlation peak associated with the direct path component of the signal, resulting in inaccurate TOA measurements. In contrast, an adjacent cell-sector 12c (of the same base station 10) in this example is characterized by an open space area 650 where signals are unlikely to be reflected. As a consequence, the receiver of the mobile communications device UE1 receives the direct path component 670 of the signal intended for the neighbouring cell-sector 12c. Although this may be characterized by a lower RSS than the signal which serves the cell-sector 12b, it has the merit that it is not affected by any multipath disruption. In particular in this example, because of the directional nature of the cell-sector signals, a component of the signal intended for the neighbouring cell-sector 12c that might have been reflected by the obstacle 630 is too weak to distort the TOA measurement.

Both signals are transmitted by the same base station 10 (and therefore from essentially the same location). Because they are transmitted from the same base station 10, both signals are expected to exhibit a consistent relationship in their time of transmission. According to an embodiment of the invention, TOAs of cell-sector signals coming from the same base station are firstly compared together and then the comparison is used to help in the calculation of the time of arrival of a direct path component.

Figure 7:
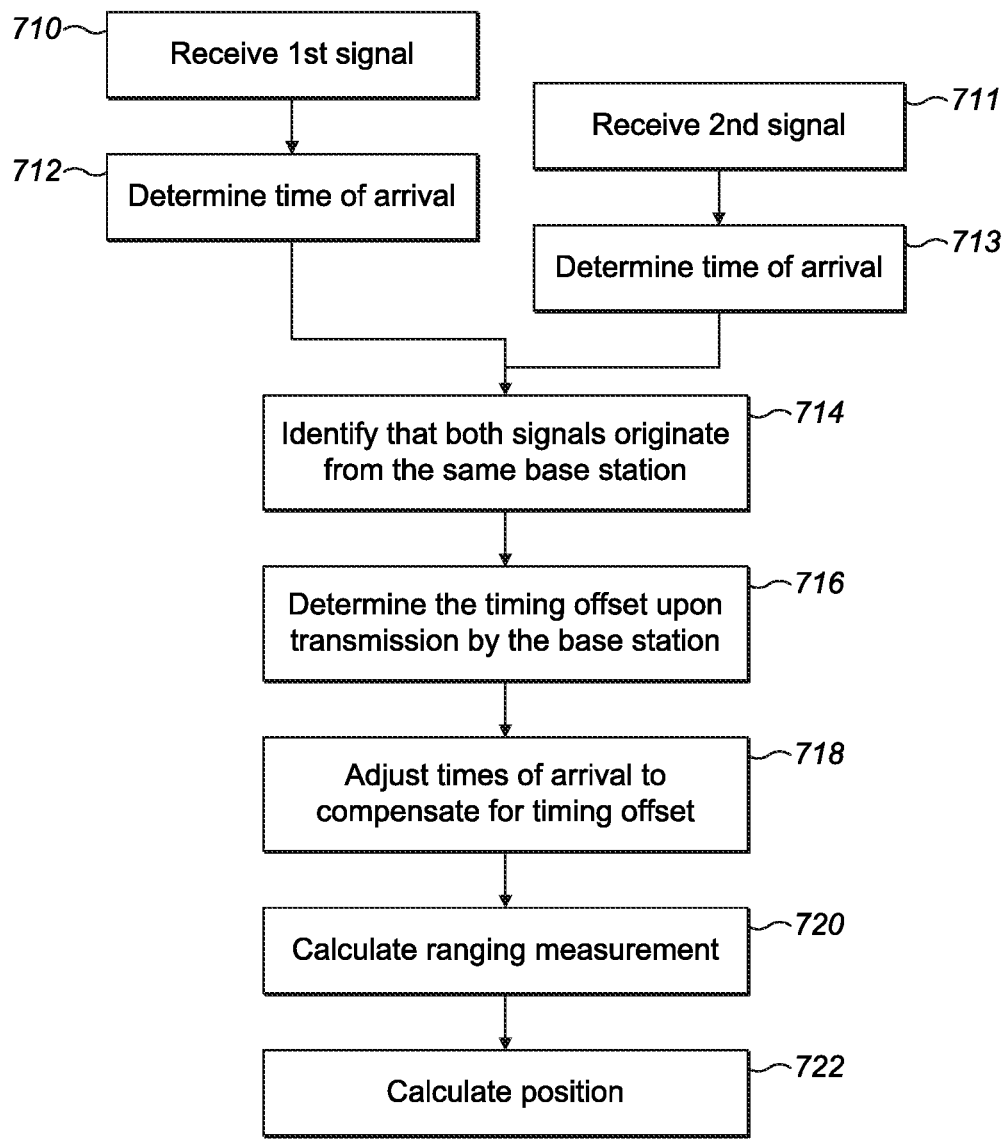
FIG. 7 is a flowchart illustrating a method of calculating a ranging measurement and a position, according to a first embodiment of the invention.
Figure 9:
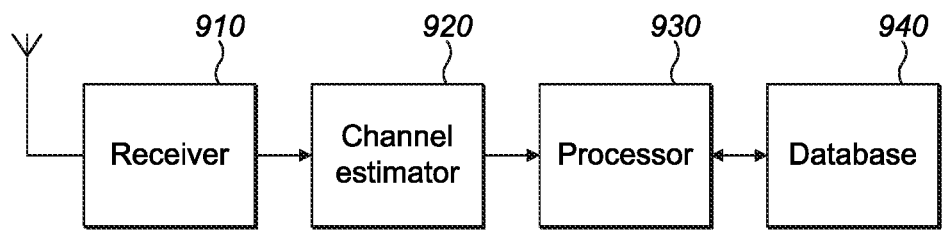
FIG. 9 is a functional block diagram of a mobile communications device according to an embodiment of the invention.

FIG. 7 illustrates a method of calculating a ranging measurement and calculating a position of a UE according to a first embodiment of the invention. FIG. 9 is a functional block diagram of the UE. The UE comprises a receiver 910, for receiving radio signals from base stations in a cellular communications network; and a processor 930, adapted to determine a ranging measurement between the base station and the UE. It also comprises a channel estimator 920, for estimating a channel transfer function for each received signal for use in determining the times of arrival.

In step 710, the receiver 910 receives a first signal associated with a first cell-sector of a sectorised base station in the cellular communications network. In step 712, the processor 930 determines a first time of arrival of a portion of the first signal. The processor determines the time of arrival using a channel transfer function estimated by the channel estimator 920, in the manner described previously above.

In step 711, the receiver 910 receives a second signal associated with a second cell-sector of the sectorised base-station. And in step 713, the processor 930 determines a second time of arrival of a portion of the second signal. This is done in the same manner as for the first signal.

In step 714, the UE identifies that the first signal and the second signal were transmitted by the same base station. In this embodiment, this step comprises decoding cell-identity information contained in each signal. The cell-identity information can be used to identify the source of the signals. This will be discussed in greater detail later below.

In step 716, the processor 930 determines a time offset between the time of transmission by the base station of the portion of the first signal and the time of transmission by the base station of the portion of the second signal. The portion of each signal used to determine the time of arrival may be the PRS, for example. In this case, the time offset may be a time difference between the time of transmission of the PRS in the first signal and the time of transmission of the PRS in the second signal.

In step 718, the processor 930 adjusts the times of arrival determined in steps 712 and 713 in order to correct for the time offset.

In step 720, the processor 930 calculates a ranging measurement, based on a combination of the at least one first time of arrival and the at least one second time of arrival. In this embodiment, the ranging measurement is a pseudorange. Finally, in step 722, the processor 930 uses this ranging measurement (together with ranging measurements for other base stations), to calculate the position of the UE.

For simplicity, the description above assumes that exactly two cell-sector signals from the same base station are received by the receiver 910. However, the same approach can be extended to any number of cell-sector signals that may be received from the same base station.

In the embodiment of FIG. 7, it is assumed that a single time of arrival is determined for each of the two signals. If there are multiple peaks in the CIR, corresponding to multiple times of arrival (as discussed already above with reference to FIG. 2) then these multiple times of arrival are reduced to a single time of arrival prior to the ranging measurement calculation. This can be done by selecting the earliest peak, in the manner discussed earlier. The ranging measurement calculation 720 is then based on the single time of arrival that has been determined for each cell-sector signal.

The single time of arrival for the first signal and the single time of arrival for the second signal are combined in step 720, to calculate the ranging measurement. The TOA measurements are compared together and the TOA which better estimates the direct path is selected. In the embodiment of FIG. 7, the processor chooses the earlier of the first time of arrival and the second time of arrival. If there are more than two signals, the processor chooses the earliest TOA among all received signals transmitted by the same base station. The reason for this is that the direct path is the shortest route from the base station to the receiver. The component of the signal following the shortest route (that is, the direct path) is assumed to be characterized by the minimum TOA among all detected TOAs (after the TOAs have been corrected appropriately for any timing offset in the time of transmission from the base station).

The position calculation 722 can be based on any suitable method for calculating a position from ranging measurements, such as trilateration.

In a practical embodiment of the method of FIG. 7, the receiver 910 of the UE is programmed or set to search for signals coming from all visible base stations. The way in which this search is performed (for example, searching over frequency, code, or time) will vary depending on the cellular technology in use. Suitable search methods for detecting various cellular communications signals are known in the art.

Rather than calculating timing measurements for all visible signals and then calculating individual ranging measurements separately (irrespective of which base station the signals came from), the present embodiment includes a step 714 in which signals coming from different cell-sectors of the same base station are identified and grouped together. In steps 716 and 718, transmission time offsets between the signals intended for different cell-sectors of the same base station are determined and the timing measurements are adjusted so that all timing measurements are directly comparable with each other. Depending on the cellular system in use, the portions of the cellular signals that are suitable for obtaining timing measurements might be transmitted from the base station at different times. For example, for LTE cellular systems, there are two portions of the LTE signal that are particularly suitable for timing measurements: CRS and PRS. Depending on the specific implementation of the cellular receiver, timing measurements can be performed exclusively on CRSs, or exclusively on PRSs, or on a combination of both. While CRSs from different cell-sectors of the same base station are always transmitted on the same timeslot of the OFDM frame, PRSs can be received on several adjacent timeslots. Therefore, timing measurements of signals coming from different cell-sectors might be performed on different time slots (but still very close together in time). The presence of these time offsets also depends on the specific implementation of the receiver.

One exemplary method of determining the timing offsets in step 716 will now be described. It is noted that the scope of the invention is not limited to this method. According to the method, the processor 930 determines the expected timing relationship by decoding cell-identity information contained in each signal. In particular, the step 716 of determining the expected timing relationship comprises using the decoded cell-identity information as a key to search a database 940 of cell-sectors. The cell-sector database 940 contains records of each cell-sector, the base station that controls it, and a timing offset of that cell-sector relative to other cell-sectors of the same base station. Using the example of FIG. 1, the database 940 records that cell-sectors 12a, 12b, and 12c are all controlled by the same base station 10. One cell-sector 12a may be arbitrarily chosen as a reference and assigned a timing offset of t=0. A second cell-sector 12b may have a timing offset of +3 μs, compared with the reference cell-sector 12a. A third cell-sector 12c may have a timing offset of −2 μs, compared with the reference cell-sector 12a. The database 940 records all of this information. When the UE decodes the cell-identity information for each received signal, it consults the database 940 to determine the relative timing of the signals at the transmitter (base station).

The database 940 may be provided by the network operator. Alternatively, the database 940 may be provided by a third party.

In one example, the database 940 may be constructed using observations (that is timing measurements) contributed by many different mobile communications devices ("crowd sourcing" the timing measurements).

For example, a timing offset between two cell-sectors can be measured by a mobile communications device (UE) in good signal conditions, when the receiver of the UE can detect the direct path signals from both sectors clearly and can determine a unique time of arrival for each signal. The timing offset is then simply the difference between these two unique times of arrival. Good signal conditions may be obtained, for example, when a UE is in the overlap (handover) region between the two cell-sectors. In general, the UE that is contributing the observation about the timing offset does not need to know that it has observed two cell-sectors of the same base station—it can simply submit the timing offset measurement to a central database 940, along with the cell-identity information for each signal. The central database may determine that the signals are for two cell-sectors of the same base station (based on the cell-identity information and/or using data provided by the network operator) and can then populate the database with the timing offset accordingly. However, optionally, the UE itself may be aware that the signals are from the same base station. This allows the UE to construct its own database (which may be stored locally at the UE), without needing to communicate with a remote database.

As an alternative to crowd-sourcing, or individual UEs constructing their own databases (or in addition to those approaches), a database may be constructed in a planned way, using dedicated measurement equipment.

The database 940 may be stored centrally. In this case, it may be accessed by the UE via the cellular communications network. Alternatively, at least a portion of the database 940 may be stored in a non-volatile memory on board the UE, for use in the ranging measurement calculation.

Figure 8:
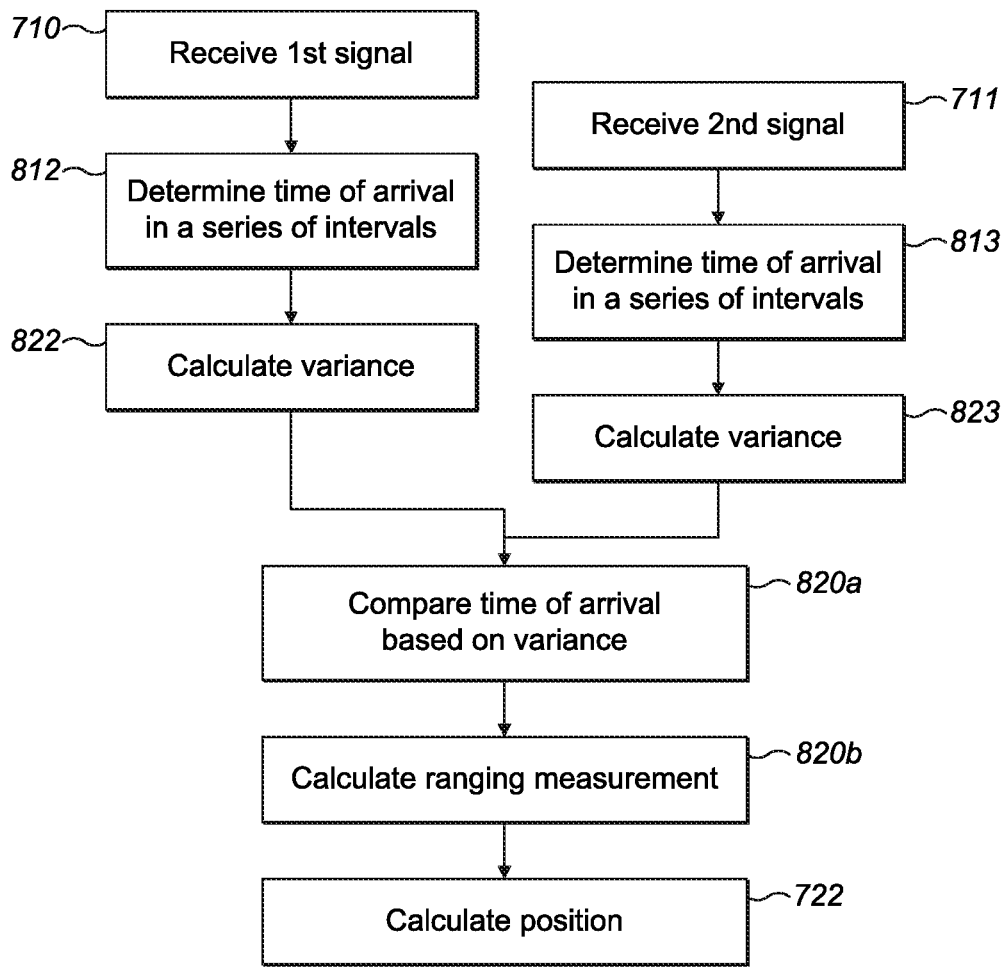
FIG. 8 is a flowchart illustrating a method of calculating a ranging measurement and a position, according to a second embodiment of the invention.

FIG. 8 illustrates a method of calculating a ranging measurement and calculating a position of a UE according to a second embodiment of the invention. Steps that are identical to the method of FIG. 7 are given the same reference numerals and will not be discussed again.

As already discussed above, determining the time of arrival from the CIR can generate false early peaks (earlier than the true LOS peak), which can result in inaccurate TOA measurements. According to the second embodiment, this is addressed using a statistical approach, by detecting and removing outliers. Instead of estimating the TOAs at each epoch separately, timing measurements are tracked for the whole period of time during which the signal is visible at the receiver. This tracking phase enables the estimation of statistical metrics (for example, the variance of TOAs of each tracked signal), which can be used to optimize the selection of a TOA and calculation of the ranging measurement.

The method of FIG. 8 differs from the first embodiment of FIG. 7 in the way that the time of arrival is determined. Instead of determining the first time of arrival of the portion of the first signal in a single time interval (as in the first embodiment), in step 812 the processor 930 estimates the first time of arrival over a series of intervals. For example, each time the PRS is repeated in the first cell-sector signal, the processor estimates a time of arrival. This produces a series of times of arrival. The processor 930 then assesses the extent to which the time of arrival of the first signal is varying, in step 822. In one example, the processor 930 calculates the difference between each successive pair of times of arrival in the series and calculates the variance of these differences. The processor 930 performs the same calculations for the second signal in steps 813 and 823.

Note that, in general, it is not essential to calculate the difference between successive times of arrival. In another example, the processor 930 could instead calculate a difference between each time of arrival and a respective expected time of arrival for that instance of the signal portion, based on knowledge of the relative time of transmission for each instance of the signal portion (for example, the times of transmission of each instance of the PRS relative to one another). This allows the processor to estimate the statistical spread of the time of arrival over the series of intervals (for example, frames or time slots), with the knowledge that each instance of the signal portion is transmitted at a different epoch with known relative time elapsed at the base station between each transmission. In other words, the transmission time for each interval is used as a reference value to calculate, for example, the time of flight for each interval and its variance over the series of intervals.

If the variance associated with a TOA is high, it means that the TOA is not consistent over time, which indicates a low level of confidence in that TOA. On the other hand if the variance is low, it means that the TOA is consistent (not varying) over time, which indicates a high level of confidence in that TOA. According to the present example, the processor 930 compares the variance for the first signal with the variance for the second signal, in step 820a. It then chooses the signal with the lower variance and uses the TOA for that signal to calculate the ranging measurement in step 820b.

The methods and apparatus described above can be applied in the context of an LTE cellular communications network. An exemplary embodiment of such an implementation will now be described. Nevertheless, as those skilled in the art will understand, the scope of the invention is not limited to LTE.

The UE is able to distinguish signals from different cell-sectors of the same base station (eNodeB). LTE signals from different cell-sectors may be distinguishable by their cell-ID. For LTE, there are 504 different Physical Cell Identities, grouped into 168 cell-ID groups denoted NID-1 (0 . . . 167) with 3 identities per group denoted NID-2 (0, 1, 2). In many LTE networks, the identities of one group are assigned to cells that are controlled by the same evolved-NodeB (eNodeB), i.e. base station controller (and can therefore be assumed to be on the same antenna site). The physical cell ID for a given cell is given by the formula: NID-CELL=3*NID-1+NID-2.

The Time of Arrival of the direct path of each signal can be individually evaluated and statistically tracked by using the EKAT algorithm, details of which can be found in Driusso et al. (Marco Driusso, Fulvio Babich, Fabian Knutti, Mischa Sabathy, and Chris Marshall, "Estimation and Tracking of LTE Signals Time of Arrival in a Mobile Multipath Environment", in Proceedings of the 9th International Symposium on Image and Signal Processing and Analysis (ISPA 2015), Zagreb, Croatia, Sep. 7-9, 2015.

Drift over time of cell-sectors has been investigated. Because the cell-sector signals are produced by the same base station, they are often part of the same installation, fed by a common frequency reference and clock, and are therefore closely synchronized. There is minimal variation in relative timing between the synchronization messages sent on two different cell-sectors of the same base station. Even when the timing at the base station drifts, the relative timing between the cell-sectors remains well controlled.

The cell-sectors may have a timing offset as a result of the base station equipment design. This can be measured over a period of time in an initial calibration phase, or can be calibrated by means of a joint estimation of the position and time offset.

Figure 10:
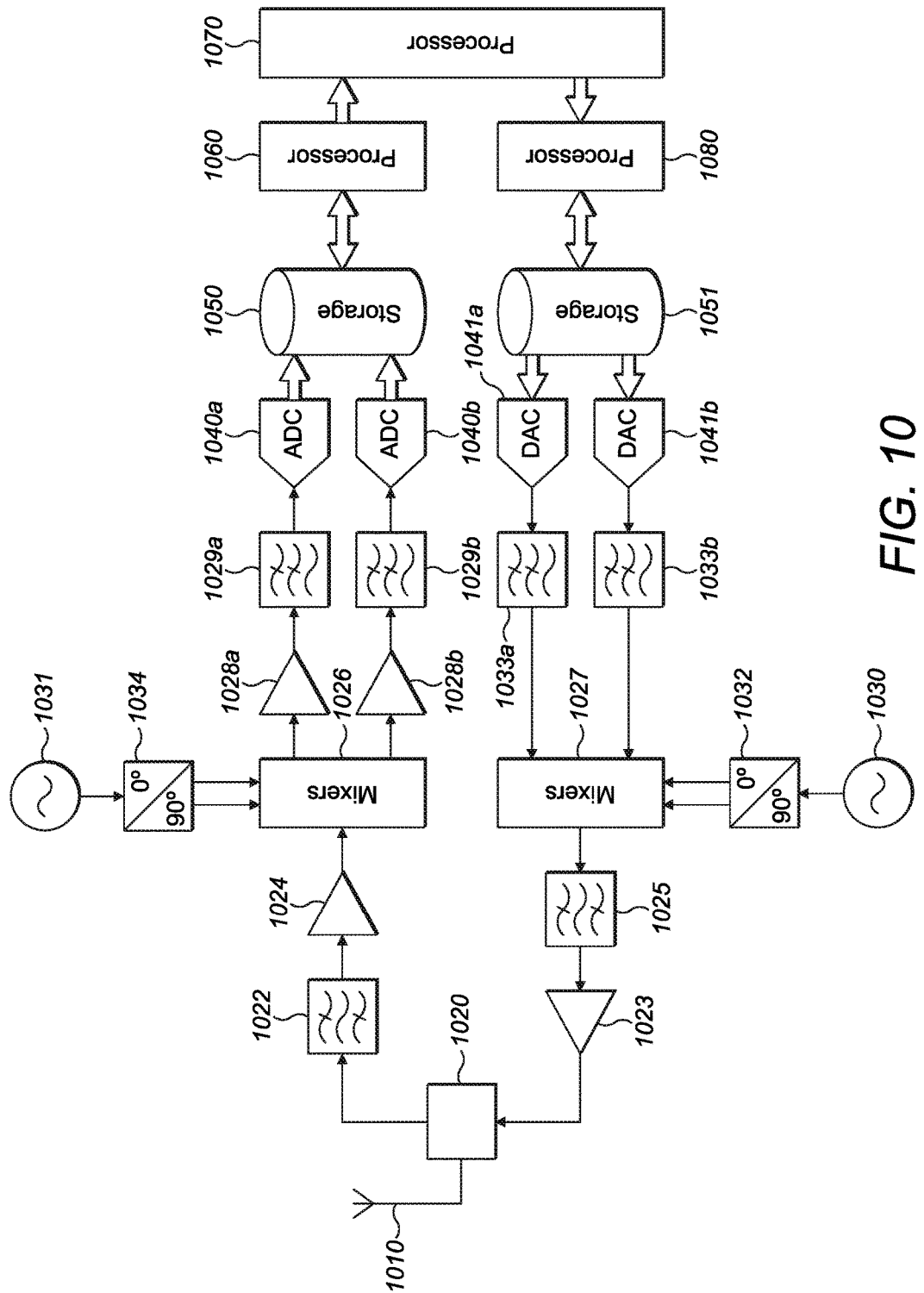
FIG. 10 is a more detailed block diagram of a mobile communications device according to an embodiment.

FIG. 10 is a more detailed block diagram of a mobile communications device (UE) according to an embodiment of the invention. The UE comprises an antenna 1010 for transmitting and receiving cellular radio signals to and from base stations. The antenna 1010 is coupled to a duplexer 1020 which allows the same antenna to be used for transmission and reception. The duplexer 1020 passes signals that are received via the antenna 1010 to an RF filter 1022. The output of the filter 1022 is coupled to the input of an amplifier 1024, which amplifies the filtered signals. The amplified signal from the amplifier 1024 is coupled to the input of a quadrature mixer 1026. Here, the signal is down-converted by mixing it with quadrature local oscillator signals. These are generated from a local oscillator (LO) 1031, via a quadrature phase splitter 1034. The output of the mixer 1026 consists of in-phase (I) and quadrature (Q) signals at intermediate frequency, or—if the LO signal is at the carrier frequency—baseband I and Q signals. The I and Q signals are amplified by respective amplifiers 1028a and 1028b and then filtered by respective filters 1029a and 1029b, before being digitised by respective analogue-to-digital converters (ADCs) 1040a and 1040b. The digitised received signals are stored in storage 1050 for processing by a first processor 1060 and a second processor 1070.

It should be noted that all of the components in the receive chain (downlink) from the antenna 1010 to the ADCs 1040 make up the receiver 910 that was shown in the functional block diagram of FIG. 9. The processor 1060 performs the function of the channel estimator 920 in FIG. 9. It also performs some of the functions of the processor block 930. The processor 1070 performs the remaining functions of the processor block 930. In greater detail, the processor 1060 performs the steps 712 and 713 of determining the times of arrival and the processor 1070 performs the step 720 of calculating the ranging measurement by combining the times of arrival. The processor 1070 also performs the step 722 of calculating the position.

For completeness, FIG. 9 also shows components for the transmit chain (uplink)—processor 1080; storage 1051; digital-to-analogue converters (DACs) 1041*a* and 1041*b*; filters 1033*a* and 1033*b*; local oscillator 1030; quadrature phase splitter 1032; quadrature mixer 1027; filter 1025; and amplifier 1023. However, these can be conventional components and, as such, do not need to be described further here.

In the embodiments described above, a single time of arrival was determined for each signal. These single times of arrival were then combined, for the cell-sector signals that originated from the same base station, in order to calculate the ranging measurement. However, in some other embodiments, it is not necessary to reduce the channel impulse response (CIR) for each cell-sector signal to a single time of arrival, before combining to calculate the ranging measurement. For example, referring to the example of FIG. 2, it is possible that multiple different times of arrival are determined for each signal, each time of arrival corresponding to a peak in the CIR. In this case, it may be preferable to maintain all of the times of arrival when combining the information to calculate the ranging measurement. If the times of arrival and the ranging measurement are always obtained based on identifying the earliest time of arrival (as described above, for the embodiment of FIG. 7), then it makes no difference whether the other, later times of arrival are discarded at the first stage (determining a single time of arrival) or at the second stage (calculating the ranging measurement). However, for an embodiment that takes other information into account, such as the consistency of TOA measurements over time, as in FIG. 8, it may be beneficial to maintain multiple times of arrival for each signal. With reference to FIG. 8, for example, each time of arrival (that is, each peak in the CIR) could be tracked over time, and the variance in relative timing calculated for each peak of each signal. The ranging measurement could then be based on the time of arrival with the lowest variance, among all times of arrival for all signals.

In all of the embodiments described so far, each time of arrival and the ranging measurement are determined by selecting among several discrete possibilities—for example, selecting the earliest time of arrival, or selecting the time of arrival with the lowest associated variance. These are simple examples, but the scope of the invention is not limited to them. For example, in some embodiments, TOA measurements could be combined by calculating a mean time of arrival and using the mean time of arrival to calculate the ranging measurement. This may be appropriate, for example, in the situation experienced by UE1 in FIG. 5, which is receiving the direct path component of both the signal intended for cell-sector 12*b* and the signal intended for cell-sector 12*c*. In such circumstances, taking a mean (or other average) may result in more accurate ranging measurements.

In the embodiments described above, the time of arrival is determined in the time domain—for example, by transforming a Channel Transfer Function (CTF) in the frequency domain into a Channel Impulse Response (CIR) in the time domain. However, as those skilled in the art will be aware, this is not essential: it is also possible to determine the at least one time of arrival by analysis performed directly in the frequency domain.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The storage/memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

The invention claimed is:

1. A method of calculating a ranging measurement in a cellular communications network,
wherein the cellular communications network comprises a sectorised base-station having a plurality of antennas, wherein the area around the base station is logically divided into azimuthal cell-sectors controlled by the base station, the base-station being configured to transmit directional signals for the different azimuthal cell-sectors from essentially the same location,
the method comprising:
receiving (710) at a receiver (910) a first signal associated with a first one of the azimuthal cell-sectors;
determining (712; 812) at least one first time of arrival at the receiver (910) of a portion of the first signal;
receiving (711) at the receiver (910) a second signal associated with a second one of the azimuthal cell-sectors;
determining (713; 813) at least one second time of arrival at the receiver (910) of a portion of the second signal; and
calculating (720; 820) a ranging measurement between the base station and the receiver (910), based on a combination of the at least one first time of arrival and the at least one second time of arrival.

2. The method of claim 1, further comprising, before the step of calculating the ranging measurement, identifying (714) that the first signal and the second signal were transmitted by the same base station.

3. The method of claim 2, wherein the step (714) of identifying that the first signal and the second signal were transmitted by the same base station comprises decoding cell-identity information contained in each signal.

4. The method of claim 1, comprising:
determining (716) an expected timing relationship between the time of transmission by the base station of the portion of the first signal and the time of transmission by the base station of the portion of the second signal; and
in the step (720, 820) of calculating the ranging measurement, calculating the ranging measurement based on a combination of the at least one first time of arrival and the at least one second time of arrival, using the expected timing relationship.

5. The method of claim 4, wherein the step (716) of determining the expected timing relationship comprises decoding cell-identity information contained in each signal.

6. The method of claim 5, wherein the step (716) of determining the expected timing relationship comprises using the decoded cell-identity information as a key to search a database (940) of cell-sectors,
wherein each cell-sector is associated in the database with the base station that controls it, and the database further comprises timing information that describes the timing relationships between cell-sectors of the same base station.

7. The method of claim 4, wherein the expected timing relationship comprises a time offset between the times of transmission by the base station of the portion of the first signal and the portion of the second signal,
wherein the step of calculating the ranging measurement further comprises correcting (718) for the time offset.

8. The method of claim 1, further comprising calculating (722) a position of the receiver using the ranging measurement.

9. The method of claim 1, wherein:
if the at least one first time of arrival comprises a plurality of first times of arrival, the method comprises reducing the plurality of first times of arrival to a single first time of arrival;
if the at least one second time of arrival comprises a plurality of second times of arrival, the method comprises reducing the plurality of second times of arrival to a single second time of arrival; and
the step (720, 820) of calculating the ranging measurement is based on a combination of the single first time of arrival and the single second time of arrival.

10. The method of claim 1, wherein the step (720) of calculating the ranging measurement comprises selecting an earliest among the at least one first time of arrival and the at least one second time of arrival.

11. The method of claim 1, wherein:
a first confidence value is associated with the at least one first time of arrival;
a second confidence value is associated with the at least one second time of arrival; and
the step (820) of calculating the ranging measurement comprises combining the at least one first time of arrival and the at least one second time of arrival based on the first confidence value and the second confidence value.

12. The method of claim 11, wherein the step (820) of calculating the ranging measurement comprises selecting among the at least one first time of arrival and the at least one second time of arrival by comparing (820 a) the first confidence value with the second confidence value.

13. The method of claim 11, wherein:
the method comprises estimating (812, 813) the at least one first time of arrival and the at least one second time of arrival, for portions of the first signal and portions of the second signal respectively, in a plurality of time intervals;
the first confidence value comprises a measure of the consistency of the estimated at least one first time of arrival over the plurality of time intervals; and
the second confidence value comprises a measure of the consistency of the estimated at least one second time of arrival over the plurality of time intervals.

14. A non-transitory computer-readable storage medium having stored thereon a computer program comprising computer program code adapted to control a mobile communications device to perform all the steps of claim 1 when said program is run on a processor of said mobile communications device.

15. A mobile communications device comprising:
a receiver (910), for receiving radio signals from a sectorised base station in a cellular communications network, the sectorised base-station having a plurality of antennas, wherein the area around the base station is logically divided into azimuthal cell-sectors controlled by the base station, the base-station being configured to transmit directional signals for the different azimuthal cell-sectors from essentially the same location; and
at least one processor (930), adapted to determine a ranging measurement between the base station and the mobile communications device,
wherein the receiver (910) is adapted to:
receive (710) a first signal associated with a first one of the azimuthal cell-sectors; and receive (711) a second signal associated with a second one of the azimuthal cell-sectors, and wherein the at least one processor (930) is adapted to:

determine (712; 812) at least one first time of arrival at the receiver (910) of a portion of the first signal;

determine (713; 813) at least one second time of arrival at the receiver (910) of a portion of the second signal; and calculate (710; 820) the ranging measurement based on a combination of the at least one first time of arrival and the at least one second time of arrival.

16. The mobile communications device of claim 15, further comprising a channel estimator (920) for estimating a first channel transfer function for the first signal and a second channel transfer function for the second signal, wherein the at least one processor (930) is adapted to determine the at least one first time of arrival from the first channel transfer function and to determine the at least one second time of arrival from the second channel transfer function.

* * * * *